US009704345B1

(12) United States Patent
Brown

(10) Patent No.: US 9,704,345 B1
(45) Date of Patent: Jul. 11, 2017

(54) SINGLE ACTION BETTING SYSTEM AND METHOD

(71) Applicant: Winzora, Inc., San Francisco, CA (US)

(72) Inventor: Wendell Brown, Henderson, NV (US)

(*) Notice: Subject to any disclaimer, the term of this patent is extended or adjusted under 35 U.S.C. 154(b) by 0 days.

(21) Appl. No.: 14/303,535

(22) Filed: Jun. 12, 2014

Related U.S. Application Data

(60) Provisional application No. 61/834,402, filed on Jun. 12, 2013.

(51) Int. Cl.
*G06F 17/00* (2006.01)
*G07F 17/32* (2006.01)

(52) U.S. Cl.
CPC ................................ *G07F 17/3288* (2013.01)

(58) Field of Classification Search
None
See application file for complete search history.

(56) References Cited

U.S. PATENT DOCUMENTS

2012/0046096 A1* 2/2012 Morrison et al. ............... 463/25

OTHER PUBLICATIONS bwin.com screens shots, dated Apr. 2013 (5 pages) according to https://web.archive.org/web/20130412202333/https://help.bwin.com/en/generalinformation/account/accountcustomize last accessed by examiner onDec. 31, 2015, source: Wayback Machine archive.com).*
bwin.com screens shots, dated Apr. 2013 (2 pages) according to https://web.archive.org/web/20130412202333/https://help.bwin.com/en/generalinformation/account/accountcustomize last accessed by examiner onDec. 31, 2015, source: Wayback Machine archive.com).*

* cited by examiner

*Primary Examiner* — Paul A D'Agostino
(74) *Attorney, Agent, or Firm* — DLA Piper LLP (US)

(57) ABSTRACT

A method and system are disclosed for placing a bet via the Internet on a computing device. The bet is placed by a player using the computing device and received by a backend system over a link using a single action methodology.

10 Claims, 4 Drawing Sheets

SINGLE ACTION BETTING SYSTEM AND METHOD

PRIORITY CLAIM/RELATED APPLICATION

This application claims the benefit under 35 USC 119(e) and priority under 35 USC 120 to U.S. Provisional Application No. 61/834,402, filed on Jun. 12, 2013 and titled "Single Action Betting System And Method", the entirety of which is incorporated herein by reference.

FIELD

The disclosure relates to a gaming system and method.

BACKGROUND

Typical mobile games that accept real-money betting today (a few exist in Europe and a few other countries) require the user to use multiple clicks (or touches) to: a) Select a bet amount b) place their bet; and/or c) begin the game. These multiple clicks may cause the user to become uninterested or unwilling to place the bet, especially on a mobile device in which it is more difficult to click/touch on the proper portion of the user interface screen.

In addition, with other types of computers, it still typically requires multiple actions perform the steps to a) Select a bet amount b) place their bet; and/or c) begin the game. As with the mobile devices above, these multiple clicks may cause the user to become uninterested or unwilling to place the bet.

DETAILED DESCRIPTION OF ONE OR MORE EMBODIMENTS

The disclosure is particularly applicable to single action betting system and method implemented for mobile devices and it is in this context that the disclosure will be described. It will be appreciated, however, that the system and method may be used with various other computing devices that may be used to place bets including tablet computers, desktop computers, computer terminals and any other computing device that can display the user interface and allow the single action betting described below in more detail.

The single action system and method enables a game player to combine the steps, such as selecting a bet amount, placing a bet and/or beginning the game, into a single action. The single action system and method makes it easier and quicker for the user to place a bet and thus encourages quick/easier/additional betting.

The single action of the user may involve different actions. For example, the single action may be a single touch of the user on a user interface presented on a touch screen. The single action may also be a single click or single button press. The single action may also be a sound being spoken into a microphone of the computing device.

The single action system and method allows for placing a bet via a computing device that can be coupled to a backend system over a link. In one implementation, the bet may be placed by a player using the computing device and received by a backend system. The backend system may receive player information including identification of the player, payment information, and game information from the computing device. The backend system may then assign an identifier to the computing device and may associate the assigned identifier with the received player information. The backend system may send, to the computing device, the assigned identifier and a digital document, such as an HTML or HTML5 or similar digital document, identifying the bet amount and including a "Bet Now" button. The computing device may receive and store the assigned identifier and digital document and may display the digital document to the user, such as in a typical browser application or mobile application interface. In response to the selection of the "Bet Now" button, the computing device may send a request to place the identified bet to the backend system. The backend system may receive the request and combine the player information associated with the identifier to generate a bet placement in accordance with the payment information whereby the player effects the placement of the bet by selection of the "Bet Now" button.

Figure 1:
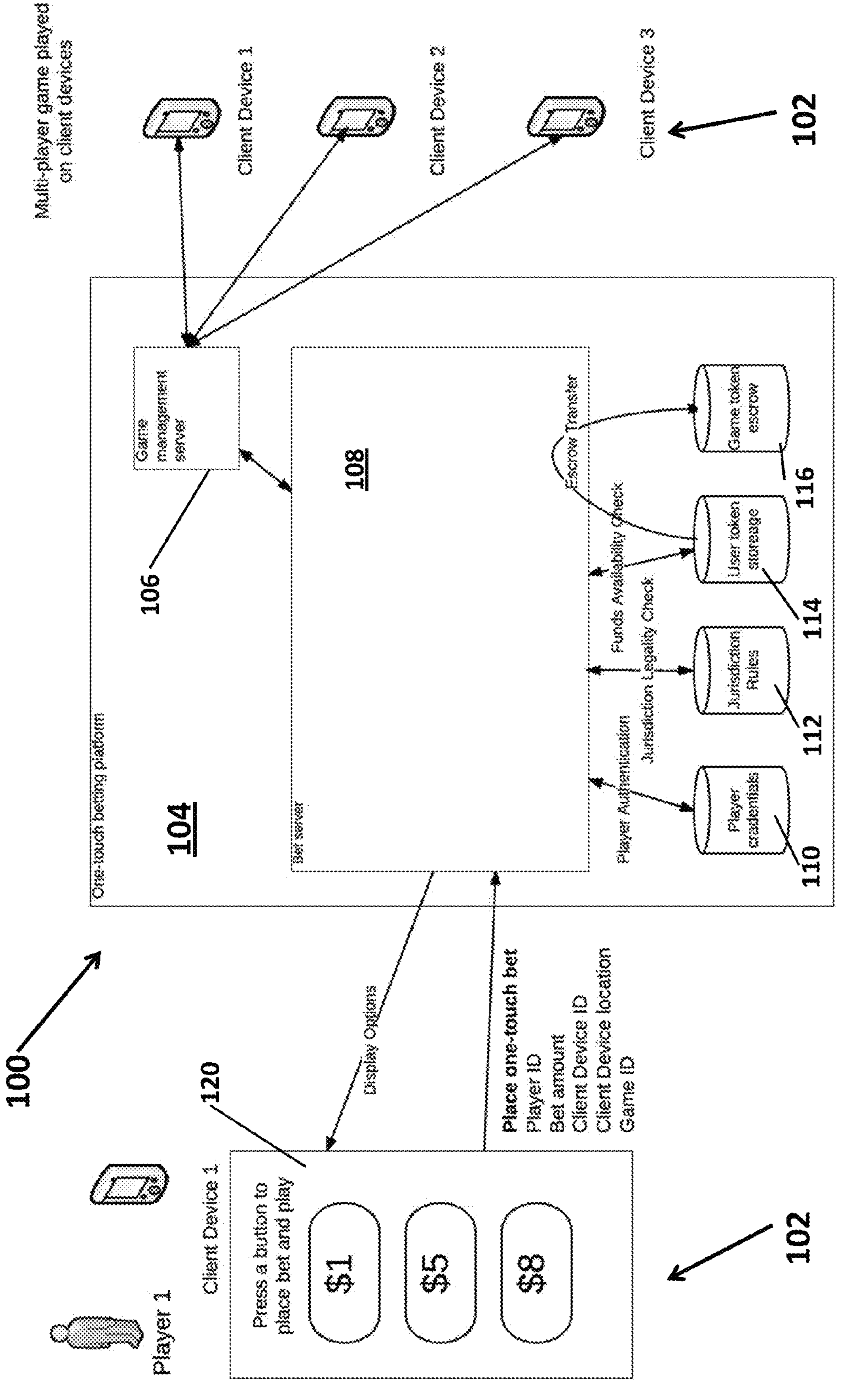
FIG. 1 illustrates an implementation of a system for single action betting.

FIG. 1 illustrates an implementation of a system 100 for single action betting. The system 100 may have one or more computing devices 102, such as client devices 1-3 shown in FIG. 1, that may be coupled to a backend system 104 over a link (not shown.) The link may be a wired or wireless link and may be, for example, the Internet, a local area network, a wide area network, a computer network, a cellular data network and the like. Each computing device 102 may be a processor based device with memory, a display and wireless or wired connectivity capabilities, such as the interfaces or circuits to be able to communicate with the backend system 104 over the link. For example, each computing device may be a smartphone device, such as an Apple iPhone, Samsung Galaxy and the like, a cellular phone device, a tablet computer, a desktop computer, a laptop computer or any other device that is able to couple to the backend system 104 and interact with it as described below in more detail. The backend system 104 may be implemented using one or more server computers each of which has typical server computer components such as a processor, memory and storage and the processor(s) of the one or more server computers execute a plurality of lines of computer code stored in storage or memory that implement the methods described below. The backend system 104 also may be implemented in hardware devices that are configured to implement the methods described below. The backend system 104 also may be implemented using cloud computing resources in which the cloud resources have typical components such as a processor, memory and storage and the processor(s) of the one or more cloud resources execute a plurality of lines of computer code stored in storage or memory that implement the methods described below.

The backend system 104 may further comprise a game management component 106, that may be implemented on a server computer, that coordinates and manages one or more multi-player games that may be played using the computing devices 102. The game management component 106 may be coupled to a bet component 108, that may be implemented on a server computer, that manages and operates the real money betting that may be executed using the backend system 100 and the computing device 102. The backend system 104 may also include one or more stores that store data used by the system and each store may be implemented in one embodiment in a hardware or software based database. For example, the stores may include a player credential store 110 that stores data about each user of the system that may be used for authentication of the users of the system, a jurisdiction rules store 112 that may be used to verify that each user is in a jurisdiction that permits gambling, a user token store 114 and a game token escrow store 116 in which the user token store is used to check if funds are available for betting for a particular user (once the user is authenticated and is within a proper jurisdiction) and the game token escrow store may store an escrow transfer when the user has placed a bet in a game until the game is completed.

As shown in FIG. 1, each computing device 102 may generate a user interface 120 on the display of the computing device that allows the user to select a bet, such as $1, $5 or $8 in the example user interface in FIG. 1, place the bet and play the game using one touch or one click in a one touch betting process. The system can be used with any different bet amounts and various different games. To implement the one touch betting process, each computing device may execute a typical browser application that interacts with the backend system 104 and then displays the user interface. In an alternative embodiment, each computing device may execute a mobile application (or download and execute the mobile application if the mobile application is not already resident on the computing device) that interacts with the backend system 104 and then displays the user interface. The single action betting process is now described in more detail.

Figure 2:
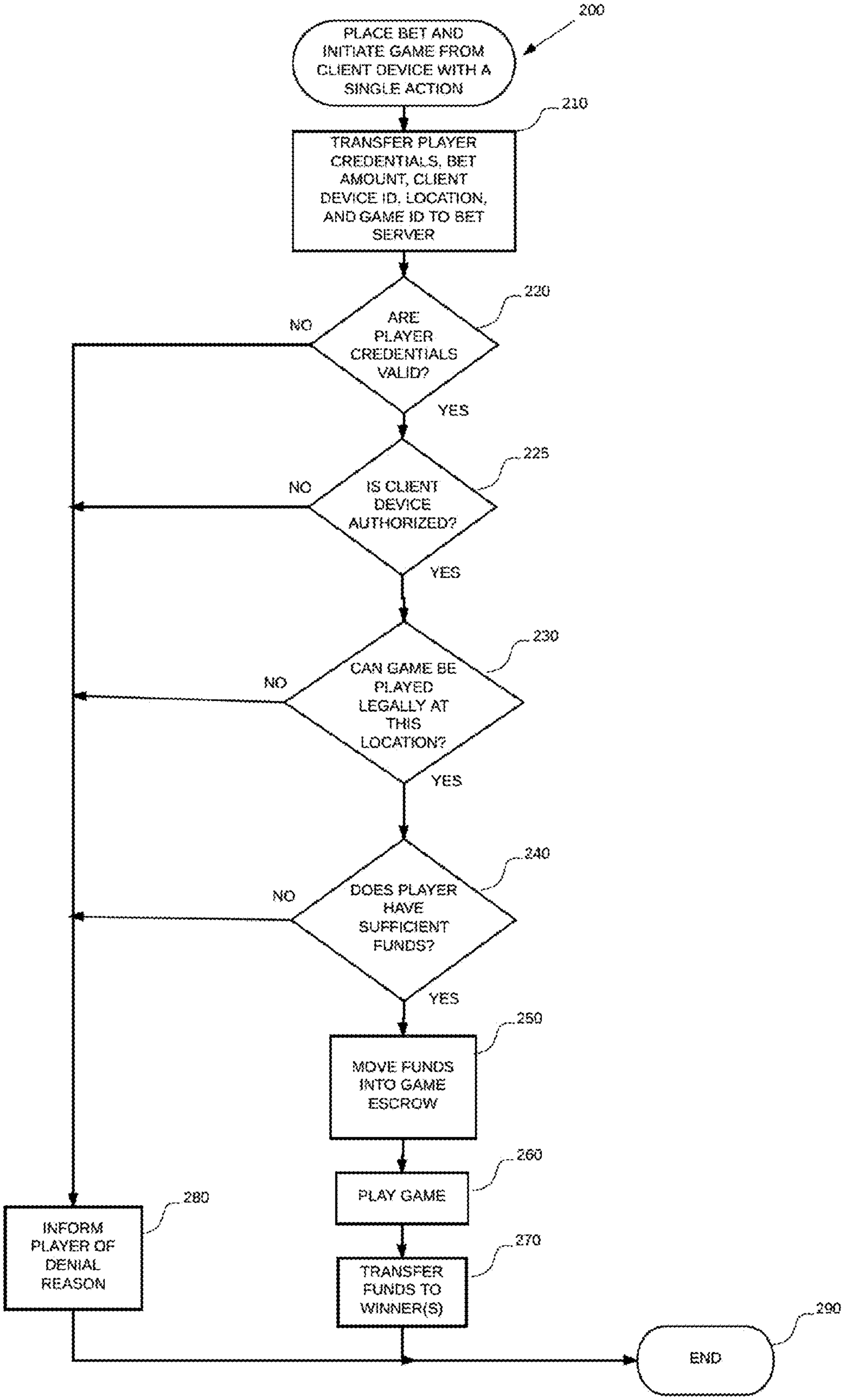
FIG. 2 is a flowchart of a method for single action betting.

FIG. 2 is a flowchart of a method for single action betting 200 in which the user (also referred to as a player) is able to place a bet and initiate a game from the computing device using a single action wherein the action depends on the type of computing device being used. As shown in FIGS. 1 and 2, the computing device, based on a user interaction with the user interface, may transfer a set of information to initiate a single action bet (210) that may include player credentials, a bet amount, an identifier for the computing device (also known as a client device) being used by the user, a location of the computing device and a game identifier for the game to be played by the user. In some embodiments, the player does not explicitly identify themselves when placing a bet. The set of information may be received by the betting component 108. Using the player credentials store 110, the betting component 108 may verify that the particular user of the computing device has valid credentials (220) or inform that user/player of a denial (280) and end the process (290). Each of the processes 220-240 may also include an age check process to ensure that the player is of legal age to place a bet. The age check process may be part of the credential verification process 220, but may also be performed at one or more different points to ensure that the player is not underage.

If the player has valid credentials, then the betting component determines, based on the client device ID whether the particular client device by used by the player is authorized (225) or inform that user/player of a denial (280) and end the process (290). If the client device is authorized, then the betting component determines, based on the location of the player/computing device and the jurisdiction rules store 112, that the game can be legally played at the location (230) or inform that user/player of a denial (280) and end the process (290). The location of the player/computing device may be performed based on GPS data or based of cellular tower data, each of which may be used to verify the geo-location of the player/computing device.

The betting component may then determine if the player has sufficient funds (240) to place the bet amount using the user token store 114 or inform that user/player of a denial (280) and end the process (290). In some embodiments, the betting component may verify the funds over a wireless network, such as mobile, wifi, etc. If the player has sufficient funds, then the betting component moves funds equal to the bet amount into the game escrow store 116 for the player (250) to be held for the player pending the outcome of the game. The game may then be played (260) and any funds are transferred to one or more winners (270). Using the above process, the player may, based on an interaction with the computing device, select a bet, place a bet and opt to play the game using a single action. In one implementation in which the computing device has a touch screen, the user may use a single touch to select a bet, place a bet and opt to play the game.

Figure 3:
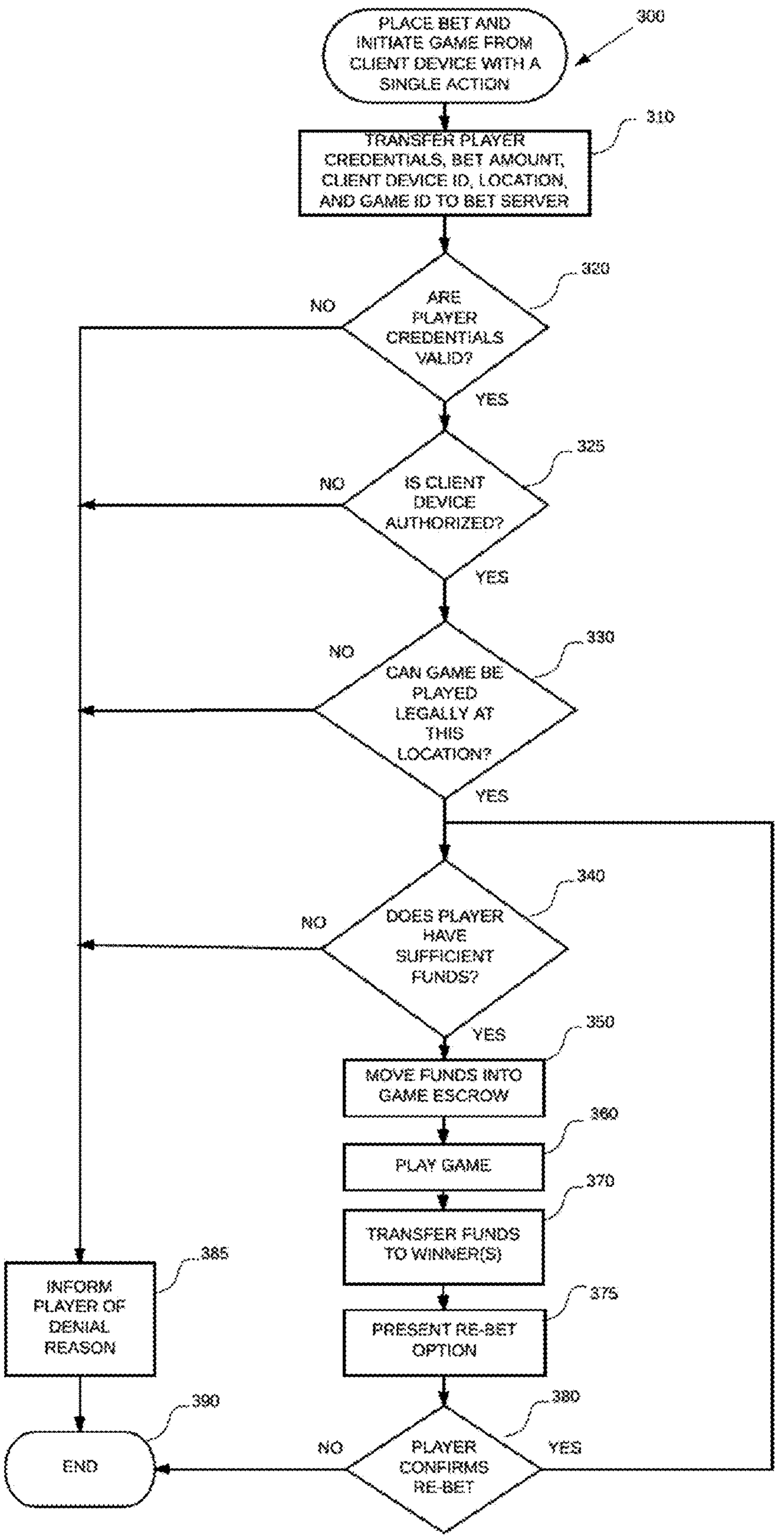
FIG. 3 is a flowchart of a method for single action betting with re-betting.

FIG. 3 is a flowchart of a method for single action mobile betting with re-betting 300 in which the user (also referred to as a player) is able to place a bet and initiate a game from the computing device using a single action wherein the action depends on the type of computing device being used. As shown in FIGS. 1 and 3, the computing device, based on a user interaction with the user interface, may transfer a set of information to initiate a single action bet (310) that may include player credentials, a bet amount, an identifier for the computing device (also known as a client device) being used by the user, a location of the computing device and a game identifier for the game to be played by the user. In some embodiments, the player does not explicitly identify themselves when placing a bet. The set of information may be received by the betting component 108. Using the player credentials store 110, the betting component 108 may verify that the particular user of the computing device has valid credentials (320) or inform that user/player of a denial (385) and end the process (390). Each of the processes 320-340 may also include an age check process to ensure that the player is of legal age to place a bet. The age check process may be part of the credential verification process 320, but may also be performed at one or more different points to ensure that the player is not underage.

If the player has valid credentials, then the betting component determines, based on the client device ID whether the particular client device by used by the player is authorized (325) or inform that user/player of a denial (380) and end the process (390). If the client device is authorized, then the betting component determines, based on the location of the player/computing device and the jurisdiction rules store 112, that the game can be legally played at the location (330) or inform that user/player of a denial (385) and end the process (390). The location of the player/computing device may be performed based on GPS data or based of cellular tower data, each of which may be used to verify the geo-location of the player/computing device.

The betting component may then determine if the player has sufficient funds (340) to place the bet amount using the user token store 114 or inform that user/player of a denial (385) and end the process (390). In some embodiments, the betting component may verify the funds over a wireless network, such as mobile, wifi, etc. If the player has sufficient funds, then the betting component moves funds equal to the bet amount into the game escrow store 116 for the player (350) to be held for the player pending the outcome of the game. The game may then be played (360) and any funds are transferred to one or more winners (370). Once the game is completed, the betting system may present a re-bet option to the player (375) and the player may confirm a re-bet (380)

and the process loops back to verifying the funds (340.) Using the above process, the player may, based on an interaction with the computing device, select a bet, place a bet and opt to play the game using a single action. In one implementation in which the computing device has a touch screen, the user may use a single touch to select a bet, place a bet and opt to play the game.

In another implementation, the system may have an automatic re-bet process in which the player commits to the system making a re-bet when the player achieves a certain level or when the player loses the game. For example, the system may require the player to bet $1 and get 3 tries at a game. If the player wins, then the player may keep the 2 tries but can't cash them out. If the player loses the game, then the system plays again automatically.

Figure 4:
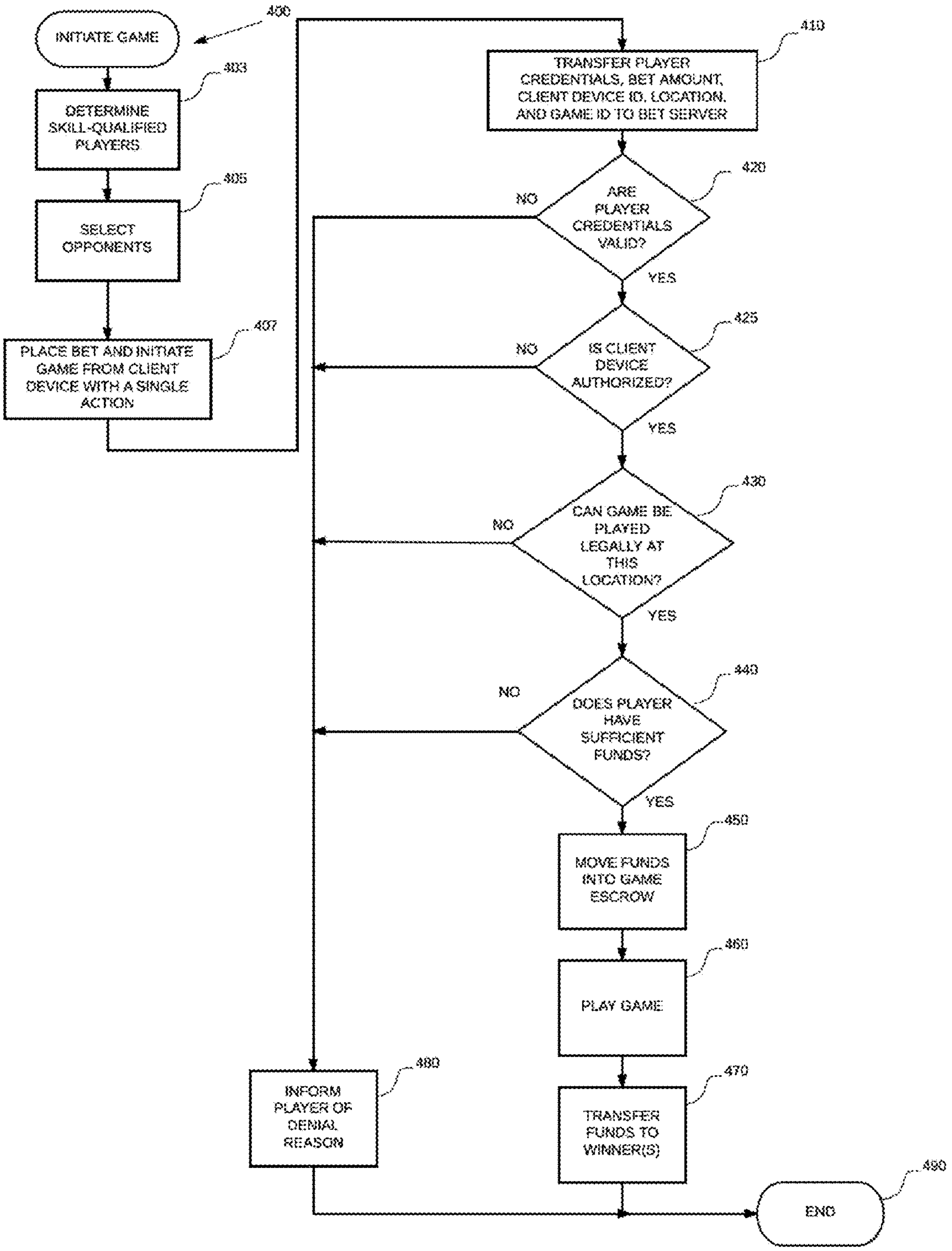
FIG. 4 is a flowchart of a method for single action betting with event specific betting.

FIG. 4 is a flowchart of a method for single action mobile betting with event specific betting 400 in which a multi-player game is initiated and skill qualified players (for example, players who have a similar skill level to the particular player in a particular game, a player who has won 3 games in a row or a player who is in the top 5 of a league) are determined (403) and opponents selected (405.) In one implementation, the game management component 106 of the backend system may determine the skill qualified players for the game. The selection may also be done using social network friends, such as Facebook friends.

In this method in FIG. 4, the player is able to place a bet and initiate a game from the computing device using a single action wherein the action depends on the type of computing device being used. As shown in FIGS. 1 and 4, the computing device, based on a user interaction with the user interface, may transfer a set of information to initiate a single action bet (410) that may include player credentials, a bet amount, an identifier for the computing device (also known as a client device) being used by the user, a location of the computing device and a game identifier for the game to be played by the user. In some embodiments, the player does not explicitly identify themselves when placing a bet. The set of information may be received by the betting component 108. Using the player credentials store 110, the betting component 108 may verify that the particular user of the computing device has valid credentials (420) or inform that user/player of a denial (480) and end the process (490). Each of the processes 420-440 may also include an age check process to ensure that the player is of legal age to place a bet. The age check process may be part of the credential verification process 420, but may also be performed at one or more different points to ensure that the player is not underage.

If the player has valid credentials, then the betting component determines, based on the client device ID whether the particular client device by used by the player is authorized (425) or inform that user/player of a denial (480) and end the process (490). If the client device is authorized, then the betting component determines, based on the location of the player/computing device and the jurisdiction rules store 112, that the game can be legally played at the location (430) or inform that user/player of a denial (480) and end the process (490). The location of the player/computing device may be performed based on GPS data or based of cellular tower data, each of which may be used to verify the geo-location of the player/computing device.

The betting component may then determine if the player has sufficient funds (440) to place the bet amount using the user token store 114 or inform that user/player of a denial (480) and end the process (490). In some embodiments, the betting component may verify the funds over a wireless network, such as mobile, wifi, etc. If the player has sufficient funds, then the betting component moves funds equal to the bet amount into the game escrow store 116 for the player (450) to be held for the player pending the outcome of the game. The game may then be played (460) and any funds are transferred to one or more winners (470). Using the above process, the player may, based on an interaction with the computing device, select a bet, place a bet and opt to play the game using a single action. In one implementation in which the computing device has a touch screen, the user may use a single touch to select a bet, place a bet and opt to play the game.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A method of placing a bet for a game comprising:
- displaying, under control of a client system, information identifying a betting opportunity for a user and in response to only a single action being performed, sending a request to place the bet along with an identifier of a player of the game to a server system;
- receiving the request by a betting component of a backend system;
- retrieving, by the betting component, additional information previously stored for the player identified by the identifier in the received request;
- validating the credentials of the player and verifying that the player has sufficient funds based on the additional information retrieved for the player;
- generating, by the betting component, a bet based on the request and placing the bet to commence the game if the player credentials are validated and the player has sufficient funds; and
- whereby the bet is placed and the game play is initiated without using multiple actions by the player.

2. The method of claim 1, wherein the displaying of information includes displaying information indicating the single action.

3. The method of claim 1, wherein the single action is clicking a button.

4. The method of claim 1 further comprising receiving, by a microphone of the client system, a spoken sound that is the single action.

5. The method of claim 1, wherein the player does not need to explicitly identify themselves when placing a bet.

6. An apparatus for placing a bet for a game, comprising:
- a computing device having a display that displays information identifying an item and an interface that receives a single action being performed by the user and sending a request to place the bet along with an identifier of a player of the game to a betting system;
- the betting system capable of being coupled to the computing device over a link;
- the betting system having a betting component that receives the request, retrieves additional information previously stored for the player identified by the identifier in the received request, validates the credentials of the player and verifies that the player has sufficient funds based on the additional information retrieved for the player, generates a bet based on the request and placing the bet to commence the game if the player credentials are validated and the player has sufficient funds so that the bet is placed and the game play is initiated without using multiple actions by the player.

7. The apparatus of claim 6, wherein the displaying of information includes displaying information indicating the single action.

8. The apparatus of claim 6, wherein the single action is clicking a button.

9. The apparatus of claim 6, wherein the computing device further comprises a microphone that receives a spoken sound that is the single action.

10. The apparatus of claim 6, wherein the player does not need to explicitly identify themselves when placing a bet.

* * * * *